US010326144B2

(12) United States Patent
Friesen et al.

(10) Patent No.: US 10,326,144 B2
(45) Date of Patent: Jun. 18, 2019

(54) HYGROPHOBIC CONDUCTOR LAYER FOR ELECTROCHEMICAL CELL

(75) Inventors: Cody A. Friesen, Fort McDowell, AZ (US); Joel Hayes, Chandler, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 985 days.

(21) Appl. No.: 13/553,269

(22) Filed: Jul. 19, 2012

(65) Prior Publication Data
US 2013/0022881 A1 Jan. 24, 2013

Related U.S. Application Data

(60) Provisional application No. 61/509,390, filed on Jul. 19, 2011.

(51) Int. Cl.
| | | |
|---|---|---|
| *H01M 8/22* | (2006.01) | |
| *H01M 4/86* | (2006.01) | |
| *H01M 4/90* | (2006.01) | |
| *H01M 12/08* | (2006.01) | |
| *H01M 4/92* | (2006.01) | |

(52) U.S. Cl.
CPC ....... *H01M 4/8605* (2013.01); *H01M 4/9016* (2013.01); *H01M 4/9041* (2013.01); *H01M 12/08* (2013.01); *H01M 4/9025* (2013.01); *H01M 4/92* (2013.01); *H01M 2004/8689* (2013.01); *Y02E 60/128* (2013.01)

(58) Field of Classification Search
None
See application file for complete search history.

(56) References Cited

U.S. PATENT DOCUMENTS

| | | | | |
|---|---|---|---|---|
| 3,329,530 A | * | 7/1967 | Kometani | H01M 4/86 428/457 |
| 3,415,689 A | | 12/1968 | Carson et al. | |
| 4,246,324 A | | 1/1981 | De Nora et al. | |
| 4,765,799 A | * | 8/1988 | Waldrop | H01M 4/26 29/623.5 |
| 5,242,765 A | | 9/1993 | Naimer et al. | |
| 6,371,995 B1 | | 4/2002 | Yasunami | |
| 8,168,337 B2 | | 5/2012 | Friesen et al. | |
| 8,309,259 B2 | | 11/2012 | Friesen et al. | |
| 8,481,207 B2 | | 7/2013 | Friesen et al. | |
| 8,632,921 B2 | | 1/2014 | Friesen et al. | |
| 2008/0118826 A1 | * | 5/2008 | Shimamura | H01M 6/48 429/129 |
| 2010/0119895 A1 | | 5/2010 | Friesen | |
| 2010/0285375 A1 | | 11/2010 | Friesen et al. | |
| 2010/0316935 A1 | | 12/2010 | Friesen et al. | |
| 2011/0070506 A1 | | 3/2011 | Friesen et al. | |
| 2011/0086278 A1 | | 4/2011 | Friesen et al. | |
| 2011/0189551 A1 | | 8/2011 | Friesen et al. | |
| 2011/0200893 A1 | | 8/2011 | Friesen et al. | |
| 2011/0250512 A1 | | 10/2011 | Friesen et al. | |
| 2011/0281184 A1 | | 11/2011 | Friesen et al. | |
| 2011/0316485 A1 | | 12/2011 | Krishnan et al. | |
| 2012/0009491 A1 | | 1/2012 | Friesen et al. | |
| 2012/0015264 A1 | | 1/2012 | Friesen et al. | |
| 2012/0068667 A1 | | 3/2012 | Friesen et al. | |
| 2012/0139496 A1 | | 6/2012 | Krishnan et al. | |
| 2013/0115523 A1 | | 5/2013 | Friesen et al. | |

FOREIGN PATENT DOCUMENTS

WO 2009087917 A1 7/2009

OTHER PUBLICATIONS

Intl. Search Report/Written Opinion dated Sep. 28, 2012 of PCT/US2012/047395 filed Jul. 19, 2012 (11 pages).
International Preliminary Report on Patentability dated Sep. 19, 2014 of PCT/US12/47395 filed Jul. 19, 2012 (8 pages).
"PTFE", Polymers: A Properties Database (Online), Taylor and Francis Group, LLC, Web. Sep. 5, 2014, <www.polymersdatabase.com/entry.do?id=524&exno=524&method=view&si=POLY>.
"Nickel", Efunda: The Ultimate Online REference for Engineers, eFunda, Inc. Web, Sep. 5, 2014, <www.efunda.com/materials/elements/element_info.cfm?Element_ID=Ni>.
Chinese Office Action dated Feb. 3, 2017 for Appln. No. 201280034443.1.
Chinese Office Action dated May 4, 2016 for Appln. No. 201280034443.1.

* cited by examiner

*Primary Examiner* — Ladan Mohaddes
(74) *Attorney, Agent, or Firm* — Pillsbury Winthrop Shaw Pittman, LLP

(57) ABSTRACT

The present application relates to a layer of an oxidant electrode having hygrophobic and current collecting properties, and electrochemical metal-air cell utilizing the same.

28 Claims, 6 Drawing Sheets

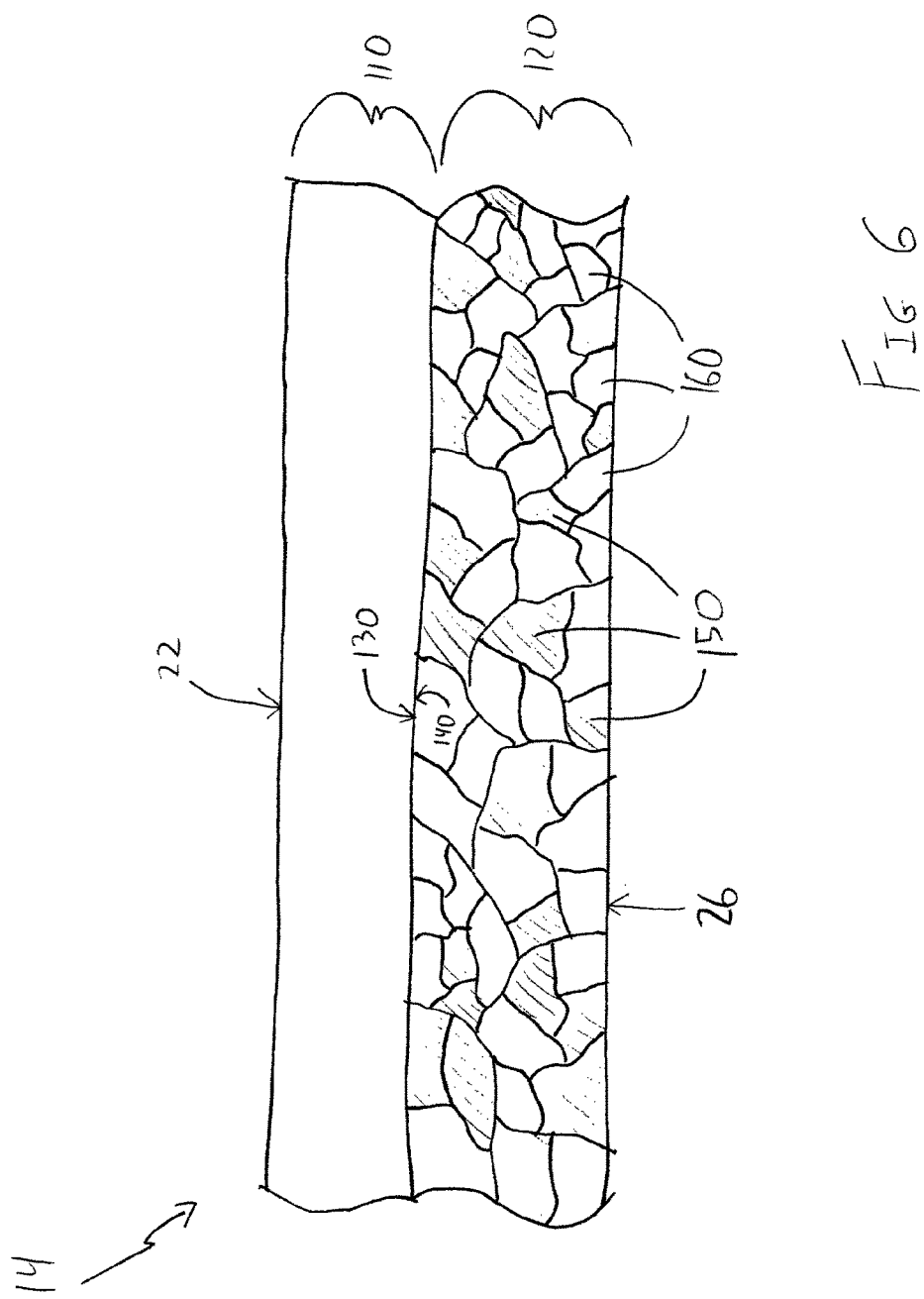

HYGROPHOBIC CONDUCTOR LAYER FOR ELECTROCHEMICAL CELL

The present application claims priority to U.S. Provisional Application Ser. No. 61/509,390, filed on Jul. 19, 2011, the entirety of which is hereby incorporated by reference.

FIELD OF THE INVENTION

The present application relates to an oxidant electrode for an electrochemical cell utilizing an ionic liquid.

BACKGROUND OF THE INVENTION

Metal-air cells typically include a fuel electrode at which metal fuel is oxidized, an oxidant electrode at which an oxidant (i.e. oxygen from the air) is reduced, and an ionically conductive medium therebetween for providing ion conductivity between the fuel and oxidant electrodes. In some embodiments of metal-air cells, or other cells utilizing an oxidant, a wound, rolled, folded, or otherwise compacted configuration may be utilized for enhancing cell space management and arrangement. In some such cells, multiple layers are formed that include the fuel electrode, the oxidant electrode, and the ionically conductive medium. The layers may then be rolled, wound, folded, or so on. Examples of such cells are disclosed in U.S. Patent Application Publication No. 2010/0285375, and U.S. application Ser. Nos. 12/776,962, 61/177,072 and 61/267,240, the entireties of which are incorporated herein by reference.

It may be appreciated that reducing the thickness of one or more of the layers of the cell may have a compounded advantage, due to the repetitive increase in thickness as the layers are wound around themselves, or folded back onto themselves. Likewise, such compounded advantages may additionally or alternatively be realized by combining the functionality of one or more of the layers of the cell. Thus, it is apparent that the reduction in thickness or elimination of one or more of the layers of such cells may greatly increase the energy and/or power density of the cell, allowing for smaller and/or more powerful batteries.

It may be appreciated that each of the broader layers of the cell (such as the oxidant electrode and the fuel electrode, for example) may be typically comprised of multiple layers of constituent materials (i.e. constituent layers). For example, in a conventional oxidant electrode that is utilized in an electrochemical cell having a liquid or semi-liquid ionically conductive medium, the oxidant electrode may have an air permeable but ionically conductive medium impermeable (i.e. liquid impermeable) layer, a catalyzed active layer, and a conductor layer. Accordingly, the benefit of a reduction in thickness of any constituent layer, or the benefit of combining any of the constituent layers, may be compounded if the layers of the cell are subsequently wound around themselves or folded back onto themselves.

SUMMARY OF THE INVENTION

According to an embodiment, an electrochemical cell includes a flexible fuel electrode for oxidizing a metal fuel, a flexible oxidant electrode for absorbing a gaseous oxidant, and a liquid ionically conductive medium contained in a space between the fuel electrode and the oxidant electrode for conducting ions for supporting the electrochemical reactions at the fuel and oxidant electrodes. The flexible oxidant electrode includes one or more active materials for reducing the gaseous oxidant. The oxidant electrode further includes a hygrophobic conductor layer for both conducting current for the reduction of the gaseous oxidant and preventing permeation of the liquid ionically conductive medium. The hygrophobic conductor layer includes a hygrophobic mixture of nickel and a hygrophobic binder, whereby the nickel in the hygrophobic mixture is essentially continuous so as to conduct electricity throughout the hygrophobic conductor layer.

According to another embodiment, an oxidant electrode for an electrochemical cell utilizing a fuel electrode and a liquid ionically conductive medium includes one or more active materials for reducing a gaseous oxidant. The oxidant electrode also includes a hygrophobic conductor layer for both conducting current for the reduction of the gaseous oxidant and preventing permeation of the liquid ionically conductive medium. The hygrophobic conductor layer includes a hygrophobic mixture of nickel and a hygrophobic binder, whereby the nickel in the hygrophobic mixture is essentially continuous so as to conduct electricity throughout the hygrophobic conductor layer. During discharge of the electrochemical cell, the fuel electrode oxidizes a metal fuel therein, the oxidant electrode absorbs and reduces the gaseous oxidant, and the ionically conductive medium separates the fuel electrode and the oxidant electrode to conduct ions therebetween for supporting the electrochemical reactions at the fuel and oxidant electrodes.

According to another embodiment, a method of assembling an oxidant electrode for an electrochemical cell utilizing a liquid ionically conductive medium includes providing particles of hygrophobic binder, providing nickel particles, and sintering the particles of hygrophobic binder together with the particles of nickel to form a hygrophobic conductor layer for the oxidant electrode. The hygrophobic conductor layer is configured for both conducting current for the reduction of a gaseous oxidant and preventing permeation of the liquid ionically conductive medium. The nickel particles in the hygrophobic conductor layer are essentially continuous so as to conduct electricity throughout the hygrophobic conductor layer. The method further includes combining the hygrophobic conductor layer with one or more active materials configured to reduce the gaseous oxidant.

Other objects, features, and advantages of the present invention will become apparent from the following detailed description, the accompanying drawings, and the appended claims.

BRIEF DESCRIPTION OF THE DRAWINGS

FIG. 6 is an exaggerated cross-sectional view of an embodiment of the oxidant electrode layer of FIG. 1, showing constituent layers thereof.

DETAILED DESCRIPTION OF THE INVENTION

The principles of any embodiment of the invention may be applied to any of the cells taught in 12/385,217, 12/385, 489, 12/549,617, 12/631,484 12/776,962, 12/885,268, 12/901,410, 13/019,923, 13/028,496, 13/083,929, 13/105,794, 13/167,930, 13/185,658, 13/230,549, 13/299,167, 13/531,962, 61/515,749, and 61/556,011, each of which are incorporated herein by reference in their entireties. The examples disclosed and described herein are not intended to be limiting.

Figure 1:
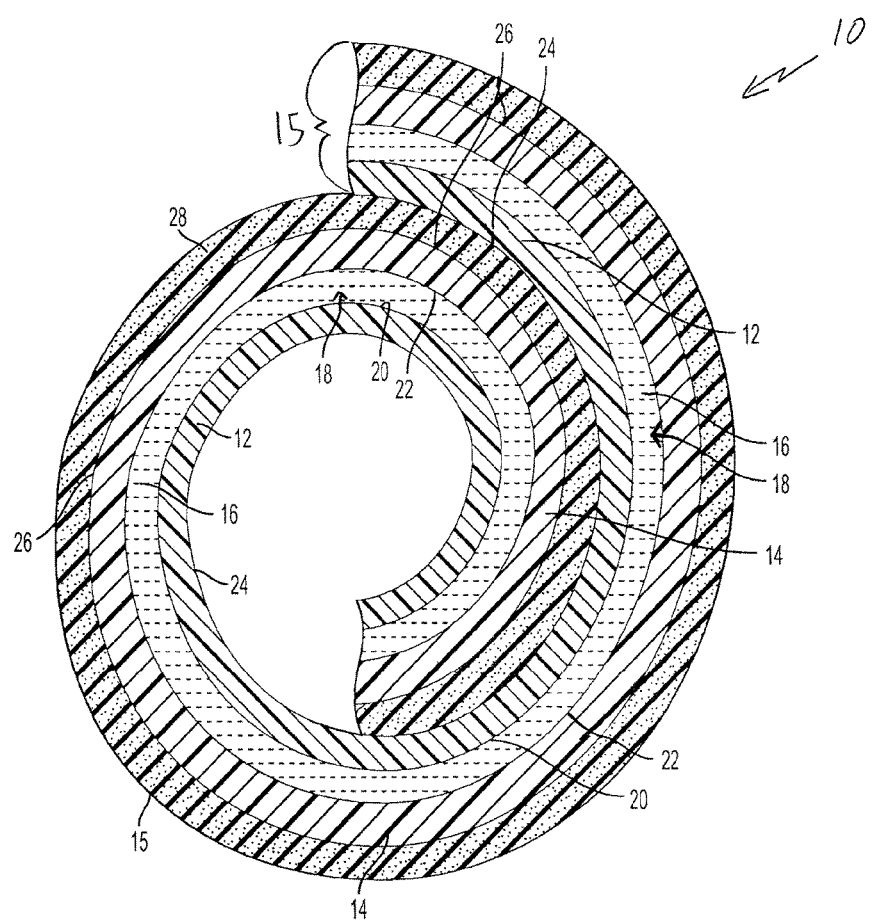
FIG. 1 is an exaggerated cross-sectional view of an electrochemical cell, the exaggeration permitting layers thereof, including an oxidant electrode layer, to be seen.

Depicted in FIG. 1 is a cross sectional view of a portion of an electrochemical metal-air cell 10. The cell 10 may have any general construction or configuration, and the example(s) described herein are not limiting. In general, the cell 10 comprises a fuel electrode 12 for receiving a metal fuel, and an oxidant electrode 14 for oxidizing an oxidant. As shown in the illustrated embodiment, the cell 10 may be designed to have its electrodes arranged in a compact configuration, such as a roll 15 in the illustrated embodiment. In other embodiments, the compact configuration may have an alternative arrangement, including but not limited to bent, folded, or tortuously layered configurations. As such, in various embodiments the electrodes and associated portions of the cell 10 may be of sufficient flexibility to facilitate such compact configurations. As shown, separating the fuel electrode 12 and the oxidant electrode 14 is an ionically conductive medium, such as an ionic liquid 16, which may be contained in a space 18 between the fuel and oxidant electrodes 12, 14. In an embodiment, the ionic liquid 16 may be a low temperature ionic liquid, including but not limited to a room temperature ionic liquid. As shown, the ionic liquid 16 may be in contact with internal surfaces 20, 22 of the fuel and oxidant electrodes 12, 14, respectively, to conduct ions therebetween. In embodiments such as that illustrated, where the fuel electrode 12 and oxidant electrode 14 are flexible for a rolled or otherwise compacted configuration, the external surfaces 24, 26 of the electrodes 12, 14 may contain a flexible, non-conductive (i.e., insulative) separator 28 therebetween to maintain a separation and prevent a short.

Although the fuel and oxidant electrodes 12, 14 in FIG. 1 are shown as unitary structures in the cross-sectional view for convenience, this should not be regarded as limiting. As described in greater detail below, in various embodiments the fuel electrode 12 and the oxidant electrode 14 may each comprise multiple components or constituent layers therein.

The fuel electrode 12 may have any construction or configuration. For example, in an embodiment the fuel electrode may be a block body or sheet of the metal fuel. In other embodiments, it may have one or more electroconductive screens, meshes, or bodies on which the metal fuel may be deposited or otherwise collected. Neither approach is intended to be limiting. In some embodiments, the fuel electrode 12 may include a porous structure with a three-dimensional network of pores, a mesh screen, a plurality of mesh screens isolated from one another, or any other suitable electrode. The fuel electrode 12 may include a current collector, which may be a separate element, or the body on which the fuel is received may be electroconductive and thus also be the current collector. Preferably, the fuel electrode 12 is laminated, bonded, or attached to a backing that provides the external surface 24 of the fuel electrode 12. In some embodiments, this backing may be liquid impermeable or essentially impermeable to the ionic liquid 16 to prevent it from permeating outwardly through the fuel electrode 12 via its external surface 24. More preferably, the backing is also impermeable to air, and particularly oxygen or other oxidant, to prevent any undesirable parasitic reaction, such as oxidant reduction in the presence of the fuel oxidation that occurs at the electrode during discharge.

The metal fuel may be of any type, and may be electrodeposited, absorbed, physically deposited, or otherwise provided on or constituting the fuel electrode 12. The fuel may be of any metal, including alloys or hydrides thereof. For example, the fuel may comprise one or more of zinc, iron, aluminum, magnesium, gallium, manganese, vanadium, lithium or any other metal. As used herein, the term metal fuel refers broadly to any fuel comprising a metal, including elemental metal, metal bonded in a molecule, metal alloys, metal hydrides, etc.

In various non-limiting embodiments, the metal fuel may be selected from the transition metals (i.e., groups 3-12 of the periodic table) or the other or post-transition metals (i.e., in groups 13-15 of the periodic table). The metal fuel may also be selected from the alkaline earth metals (i.e., group 2 of the period table). The metal may be essentially pure or pure so that all its mass is available as fuel for oxidation to maximize its energy density. Although it may be appreciated that metals from the alkaline earth metals, transition metals, and post-transition metals may generally be more stable than the alkali metals (i.e., lithium), any metal fuel may be utilized, and the descriptions herein are not intended to be limiting. Further details regarding metal fuels and fuel electrodes may be found in U.S. patent application Ser. Nos. 12/385,217, 12/385,489, 12/631,484, 12/885268, and 13/096,851, the entireties of which are incorporated herein.

The oxidant electrode 14 may be configured to absorb air or other gaseous oxidants exposed to its external surface 26 or another constituent portion thereof in a manner described below. While in some embodiments the oxidant electrode 14 is configured to receive ambient air, contained sources of oxidants may additionally or alternatively be utilized. Thus, where used herein, air refers to any gaseous oxidant source. When air is exposed to the external surface, the oxidant electrode 14 is configured to absorb gaseous oxygen (or another oxidant) for reduction of the oxygen during discharge of the cell 10. Some portions of the oxidant electrode 14 may be made porous to provide gaseous oxygen diffusion from the air side of the oxidant electrode 14 to reaction sites within the oxidant electrode 14 and to provide ionic conductivity for reactants and reaction products on the side of the oxidant electrode 14 facing the ionic liquid 16. In some embodiments, as described below, the oxidant electrode 14 may have a level of hygrophobicity with the ionic liquid 16 to prevent or essentially prevent wicking (i.e., liquid permeation) of the electrolyte through the structure. It may be appreciated that a number of configurations of the oxidant electrode 14 are possible. In particular, some configurations of the oxidant electrode 14 are the subject of the present application, and further details of these particular constructions are described below.

In some embodiments, either or both of the fuel and oxidant electrodes 12, 14 may each be configured to prevent or essentially prevent liquid permeation of the ionic liquid 16 therethrough via external surfaces 24, 26 thereof. That is, the electrode materials may be selected to prevent or essentially prevent the ionic liquid 16 from permeating in liquid form through the thickness of the electrodes 12, 14 so as to escape from the space by such liquid permeation. The term "essentially prevent" recognizes the fact that some minor liquid permeation may occur, as the porosity used to permit air/oxygen permeation may allow minor amounts of liquid permeation, but "essentially prevents" means the liquid permeation that occurs is not substantial and has little or no material impact on the operation of the cell 10.

As indicated above, in various embodiments, any number of ionically conductive mediums may be utilized herein in the electrochemical cell 10. In some embodiments wherein the ionically conductive medium comprises the ionic liquid 16, the ionic liquid 16 may be of any type, including room temperature ionic liquids, and including but not limited to the examples disclosed in U.S. application Ser. No. 12/776,962, the entirety of which is incorporated herein by reference. Some non-limiting examples of useable ionic liquids include aprotic ionic liquids synthesized from combinations of the anions of chloride ($Cl^-$), hexaflurophosphate ($PF_6^-$), bis(trifluoromethlysulfonyl)imide ($C_2F_6NO_4S_2^-$) (TFSI), or trifluoromethanesulfonate ($CF_3O_3S^-$) and cations of imidazolium, sulfonium, choline, pyrrolidinium or phosphonium and their derivatives. Protic ionic liquids, such as triethylammonium methanesulfonate and diethymethylammonium triflate may also be used. Ionic liquids with stable fluorine containing ions (such as bis(trifluoromethylsulfonyl)imide) may be desirable for their hydrophobic properties to avoid the absorption of water into the ionic liquid, particularly those with a high solubility for the metal cation of interest.

For example, in one non-limiting embodiment the ionic liquid 16 may be triethylammonium methanesulfonate (TEAMS) with 0.5 molar zinc triflate dissolved therein as an additive, and zinc may be used as the metal fuel. Potentiostatic studies of the half-cell reactions for zinc and oxygen in that ionic liquid indicate a cell potential of about 1.45V, and an estimated cell energy density in excess of 600 Wh/kg. Potentiostatic studies on the same TEAMS ionic liquid with 0.5 molar zinc triflate supplemented with 50 ppm water indicate a cell potential of about 1.5V. In another non-limiting embodiment, the ionic liquid may be TEAMS with 1.0 molar zinc bromide ($ZnBr_2$) dissolved as an additive, and zinc may be used as the metal fuel. Potentiostatic studies of the half-cell reactions for zinc and oxygen in that ionic liquid indicate a cell potential of about 1.3 V, an estimated cell energy density in excess of 500 Wh/kg, and a relatively high degree of reversibility for the zinc and oxygen reactions, which is beneficial for secondary (rechargeable) cells.

In yet another non-limiting embodiment, the ionic liquid 16 may be methyloctylimidazolium chloride with 0.5 molar manganese (II) chloride ($MnCl_2$) and 50 ppm water as additives, and manganese may be used as the metal fuel. Potentiostatic studies of the half-cell reactions for manganese and oxygen in that ionic liquid indicate a cell potential of about 1.5 V and an estimated cell energy density of about 800 Wh/kg. In still another non-limiting embodiment, the ionic liquid may be 1-butyl-3-methylimidazolium bis(trifluoromethane)sulfonamide with 5.0 molar $AlCl_3$ as an additive, and aluminum may be used as the metal fuel. Potentiostatic studies of the half-cell reaction for aluminum in that ionic liquid indicate a cell potential of about 2.5-2.8 V, an estimated cell energy density of about 2500-3000 Wh/kg, and a relatively high degree of reversibility for the aluminum reaction.

In yet another non-limiting embodiment, the ionic liquid 16 may be diethyl methyl ammonium triflate (DEMATf) with 0.5 M $ZnCl_2$ dissolved therein as an additive, and zinc may be used as the metal fuel. This embodiment has an estimated cell potential of about 1.3 V. As still another non-limiting embodiment, the ionic liquid may be DEMATf with 0.5 M $Zn(BF_4)_2$ (zinc tetrafluoroborate). This embodiment has an estimated cell potential of about 1.45V.

Still yet other non-limiting embodiments may include the following ionic liquids: (a) TEAMS with an additive of 0.01 molar Mn(II) acetate for use with manganese as the metal fuel, (b) diethylmethylammonium triflate with 1.0 molar $ZnCl_2$ as an additive for use with zinc as the metal fuel, (c) $GaCl_3$ and 1-methyl-3-octylimidazolium chloride in equal parts (tetrachlorogallate) for use with gallium as the metal fuel. In other embodiments, zinc fluoride or zinc ditriflate may be used as an additive in the ionic liquid.

In some non-limiting embodiments, a substance that may be regarded in some contexts as a solvent may be added in relatively small amounts to the ionic liquid 16, either for enhancing the solubility of solutes in the ionic liquid 16, such as an additive added to or a by-product created in the ionic liquid 16 by operation of the cell, or for providing a non-solvent functionality, such as the promotion of certain electrochemical reactions or transport of ions. Thus, the use of an ionic liquid does not entirely exclude the presence of a substance that may be regarded as solvent in other contexts, or act as a solvent with respect to solutes in the ionic liquid, but because a solvent is not necessary to dissolve an ionic liquid, it can be used in a substantially smaller amount compared to conventional electrolyte salts requiring a bulk solvent for dissolution of the salt per se, such as aqueous electrolyte solutions. Indeed, in some non-limiting embodiments it is possible that no additive solvent is used. Again, the ionic liquids 16 described herein are not intended to be limiting, and are provided solely as examples.

In some embodiments, the ionically conductive medium may be an aqueous electrolyte, such as potassium hydroxide dissolved in water. Any such aqueous electrolyte may be used. For example, in an embodiment, the ionically conductive medium may include sodium hydroxide.

In some embodiments, the cell 10 comprises one or more seal members (not shown) along a periphery of the fuel and oxidant electrodes 12, 14 for sealing the space 18 between the fuel and oxidant electrodes 12, 14 to contain the ionic liquid 16 therein. These seal members are electrically insulating to prevent electrical conduction between the fuel and oxidant electrodes 12, 14 (i.e. they prevent shorting). In some embodiments, these seal members may be attached to or formed at the peripheries of the fuel and oxidant electrodes 12, 14 to secure the peripheries prior to the cell 10 being wound into the roll 15, and thus are also flexible to permit such winding. For example, the seal members could be clips, welds, crimped structures, adhesives, epoxies, or any other suitable structure for sealing the space 18.

In the embodiment of FIG. 1, where the fuel electrode 12, the oxidant electrode 14, and the separator 28 are sufficiently flexible to be wound into the roll 15, the separator 28 is positioned between the external surfaces 24, 26 of the fuel electrode 12 and the oxidant electrode 14, respectively, to prevent electrically conducting contact therebetween. That is, separator 28 is placed against one of the external surfaces 24, 26, and the electrode 12, 14 with the ionic liquid 16 sealed therebetween and the separator 28 are wound up to form the roll 15. In an embodiment, each of the structures wound in the roll 15 has generally the same two-dimensional area and peripheral dimensions. In some embodiments, an adhesive may optionally be used between the separator 28 and one or both of the external surfaces 24, 26 to promote bonding and securement of the roll 15 against unwinding. The ionic liquid 16, which is devoid of rigid inflexible or brittle structures like glass and ceramic, permits the electrodes and separator (if any) to be flexed into the desired configuration as a roll or otherwise.

While the roll 15 shown in FIG. 1 is cylindrical, that is not intended to be limiting. For example, the roll may have a prismatic shape, such as a roll having any polygonal cross-section, such as a triangle, square, rectangle, trapezoid, pentagon, hexagon or any other configuration, and thus the term roll means wound configurations, but is not limited to cylindrical rolls. For ease of reference, the terms circumferential, radial and axial may still be used to describe relative directions with respect to such non-cylindrical rolls, and the use of such terms does not imply that the roll is necessarily cylindrical.

In some embodiments, the separator 28 may be configured to permit exposure of gaseous oxygen to the external surface 26 of the oxidant electrode 14. Specifically, the separator 28 may be designed to permit oxygen (such as pure oxygen or ambient air containing oxygen) or another oxidant to flow at least axially between the external surfaces 24, 26 within the cell 10 for exposure to the external surface 26 of the oxidant electrode 14. The separator 28 may also permit circumferential flow of the oxygen or other oxidant between the external surfaces 24, 26. Thus, by enabling flow of oxygen or another oxidant in between the external surfaces 24, 26, the oxidant can penetrate the roll 15 and be exposed to the external surface 26 of the oxidant electrode 14 for absorption and reduction during discharge.

One example of a separator 28 may be a pleated polymer sheet that provides a space between the external surfaces 24, 26 of the fuel and oxidant electrodes 12, 14, while also guiding air axially within the cell 10. Another example is a woven polymer screen where the warp is significantly finer in dimension than the weft, providing a preferential flow direction between the weft fibers, which may be oriented axially or circumferentially within the roll. Any construction or configuration may be used. Exposure of oxygen to the external surface 26 of the oxidant electrode 14 can be by providing spacing to permit open air flow directly to the oxidant electrode external surface, or by permitting permeation of the air through a porous body of the separator 28 or a porous portion of the oxidant electrode 14.

As an option, the cell 10 may further comprise a flexible internal separator (not shown) that is electrochemically inert in the ionic liquid and electrically insulating. The flexible internal separator may be wound in the roll 15 and positioned in the space 18 between the internal surfaces 20, 22 of the fuel and oxidant electrodes 12, 14 to prevent electrically conducting contact between the internal surfaces 20, 22 of the fuel and oxidant electrodes 12, 14. This may not be necessary if the fuel and oxidant electrodes 12, 14 have sufficient rigidity to maintain a spaced apart relation, but is preferred to prevent incidental contact therebetween that could short the electrodes 12, 14 together. For example, the internal separator could be an open-celled lattice, a screen, a grid, or any other structure with sufficient flexibility to enable it to be wound into the roll with the electrodes 12, 14, yet still allow the ionic liquid 16 to establish ionic conductivity between the fuel and oxidant electrodes 12, 14.

During a discharge operation of the electrochemical cell 10, the fuel electrode 12 is configured to oxidize the metal fuel while the oxidant electrode 14 is configured to reduce gaseous oxygen absorbed therein (i.e. through the external surface 26). This generates a potential difference between the fuel and oxidant electrodes 12, 14 for conducting current to a load, while the ionic liquid 16 conducts ions therebetween for supporting the electrochemical reactions at the fuel and oxidant electrodes 12, 14. Specifically, the electrodes 12, 14 are connected to the load, such as by terminals connected to conductors in the electrodes 12, 14. The oxidation of fuel at the fuel electrode 12 liberates electrons as current flow to drive the load, and provides an oxidized species of the fuel to the ionic liquid 16. The oxidant electrode 14 receives the electrons from the load, and reduces the oxygen it has absorbed to generate a reduced oxidant species for reaction with the oxidized fuel species, thus creating a metal oxide by-product. Reference may be made to the various patent applications incorporated herein for more specifics concerning the reactions, which need not be described herein in detail.

In some embodiments, the ionic liquid 16 may have a low, relatively low, or immeasurable vapor pressure above the ionic liquid's melting point at 1 atm. Because a low or immeasurable vapor pressure would result in little or no evaporation, a relatively low amount of ionic liquid 16—even just a minimal amount sufficient to support the electrochemical reactions—can be used in the cell, thus reducing its overall weight and volume and increasing its power to volume/weight ratios. Moreover, this ability to have a lower volume enables the cell to have a thinner profile, which enables it to be wound into or otherwise arranged in a compact configuration.

In some non-limiting embodiments, the space 18 between the fuel and oxidant electrodes 12, 14 is in the range of 10 microns to 300 microns. And preferably, it is in the range of 10 microns to 100 microns, or in the narrower range of 10 microns to 50 microns. In some embodiments, the use of the ionic liquid 16 enables the cell 10 to have a relatively high ratio of combined electrode thickness to ionic liquid thickness (the same may hold true for electrode volume to ionic liquid volume, as the area for both electrodes and the ionic liquid may be the same). The ratio of combined electrode thickness to ionic liquid thickness may be in the range of 1:10 to 10:1, and more preferably is in the range of 1:1 to 10:1, or 2:1 to 10:1, or 4:1 to 10:1. The ratio may also be greater than or equal to 1:1, and the ratio may even be greater than or equal to 2:1, 4:1 or 10:1 in some embodiments, with no upper limit on the ratio.

In some embodiments, the fuel electrode 12, the oxidant electrode 14, and the separator 28 (and any internal separator) are configured as rectangular sheets with substantially greater length than width. The length is the direction that is ultimately circumferential in the roll 15, and the width is the direction that is ultimately axial in the roll 15. This enables the roll 15 to have an increased number of "laps," i.e. portions overlapping one another, within the roll 15, thus contributing to increased two-dimensional electrode area in the cell 10, as discussed in greater detail below.

Figure 2:
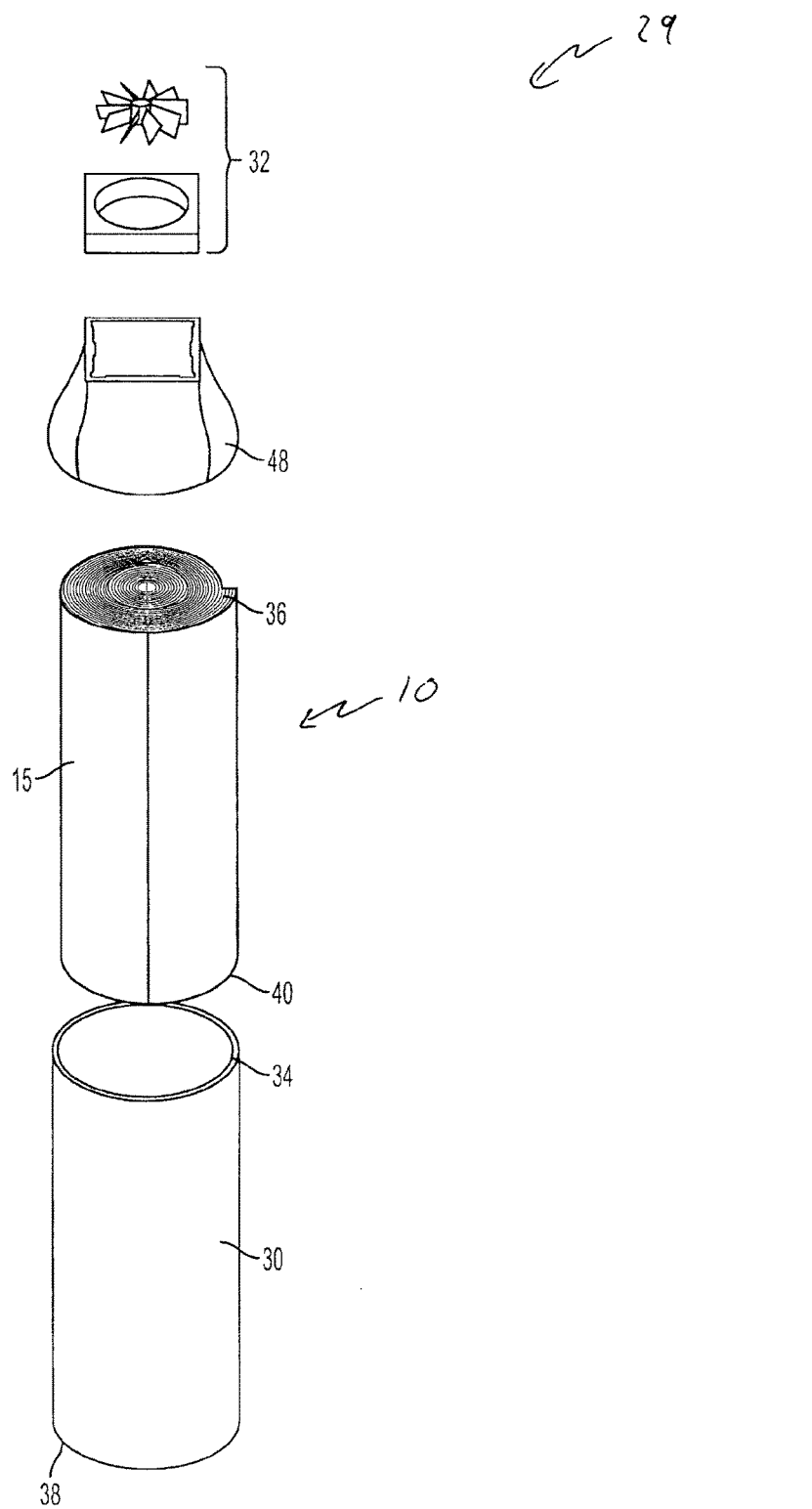
FIG. 2 depicts an exploded view of a cell assembly including the cell of FIG. 1.

Turning to FIG. 2, which depicts in an exploded view the roll 15 of the cell 10 as a portion of a greater cell assembly 29, it may be appreciated that the cell 10 may optionally be assembled into a housing 30 that is configured to receive the roll 15. The housing 30 may have any construction or configuration, and the illustrated housing 30 is not intended to be limiting. Preferably, the housing 30 has a cylindrical configuration with an internal diameter corresponding to the external diameter of the roll 15 so that it fits closely within the housing 30, as is illustrated. The cell assembly 29 may also optionally further comprise an airflow generator 32 configured to force airflow into the roll between the external surfaces 24, 26 of the fuel and oxidant electrodes 12, 14. The use of an airflow generator 32 facilitates the delivery of air to the external surface 26 of the oxidant electrode 14. The airflow generator 32 may be an electrically powered fan or impeller, as illustrated, a bellows or any other device designed to generate airflow. For example, instead of generating positive pressure, a vacuum could generate negative pressure to force the airflow as well.

Figure 3:
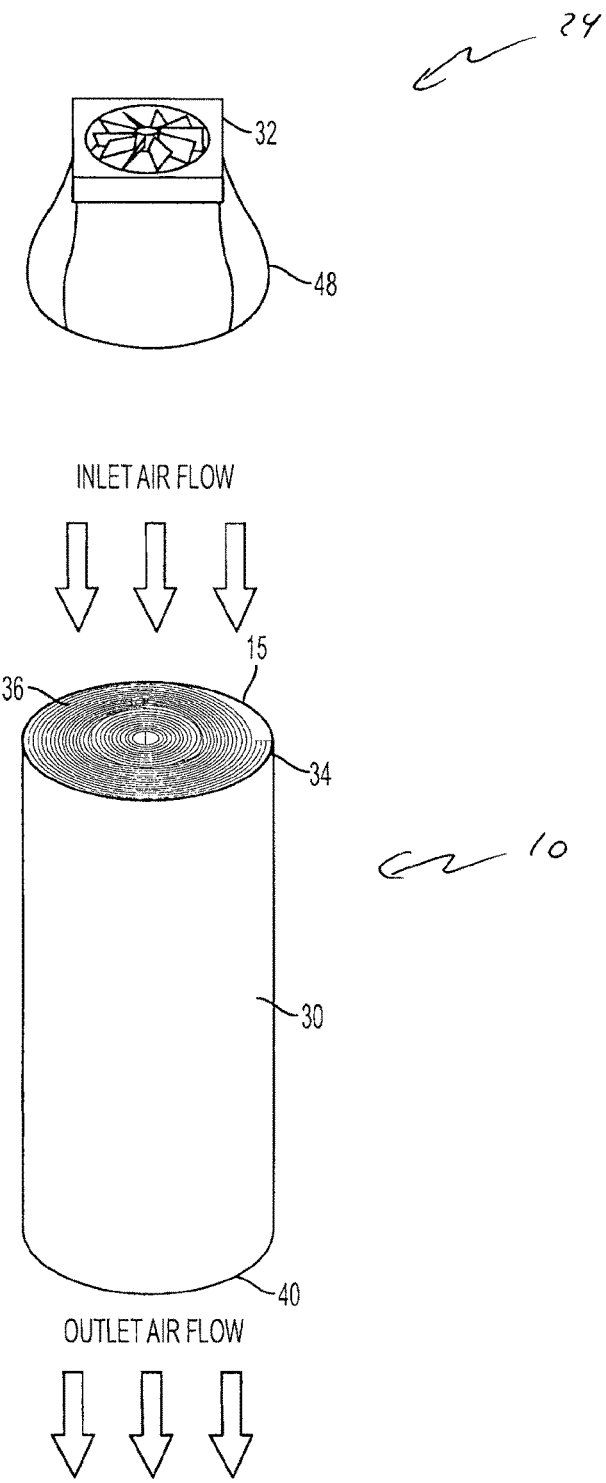
FIG. 3 is another exploded view of the cell assembly of FIG. 2, showing its airflow.

As shown in FIG. 3 the housing 30 may have an open axial airflow receiving end 34 and an axial airflow receiving end 36 of the roll 15 may face the open axial airflow receiving end 34 of the housing 30. The airflow generator 32 may be configured to force airflow into the open axial airflow receiving end 34 of the housing and into the axial end 36 of the roll 15 between the external surfaces 24, 26 of the fuel and oxidant electrodes 12, 14. The housing 30 may also have an open axial airflow exit end 38 opposite the airflow receiving end 34, and the roll 15 may have an axial airflow exit end 40 facing the open airflow exit end 38 of the housing 30. The airflow generator 32 may also force the airflow axially through the roll 15 between the external surfaces 24, 26 of the fuel and oxidant electrodes 12, 14 and axially outward from the axial airflow exit end 40 of the roll 15 for exit through the open axial airflow exit end 38 of the housing.

Figure 4:
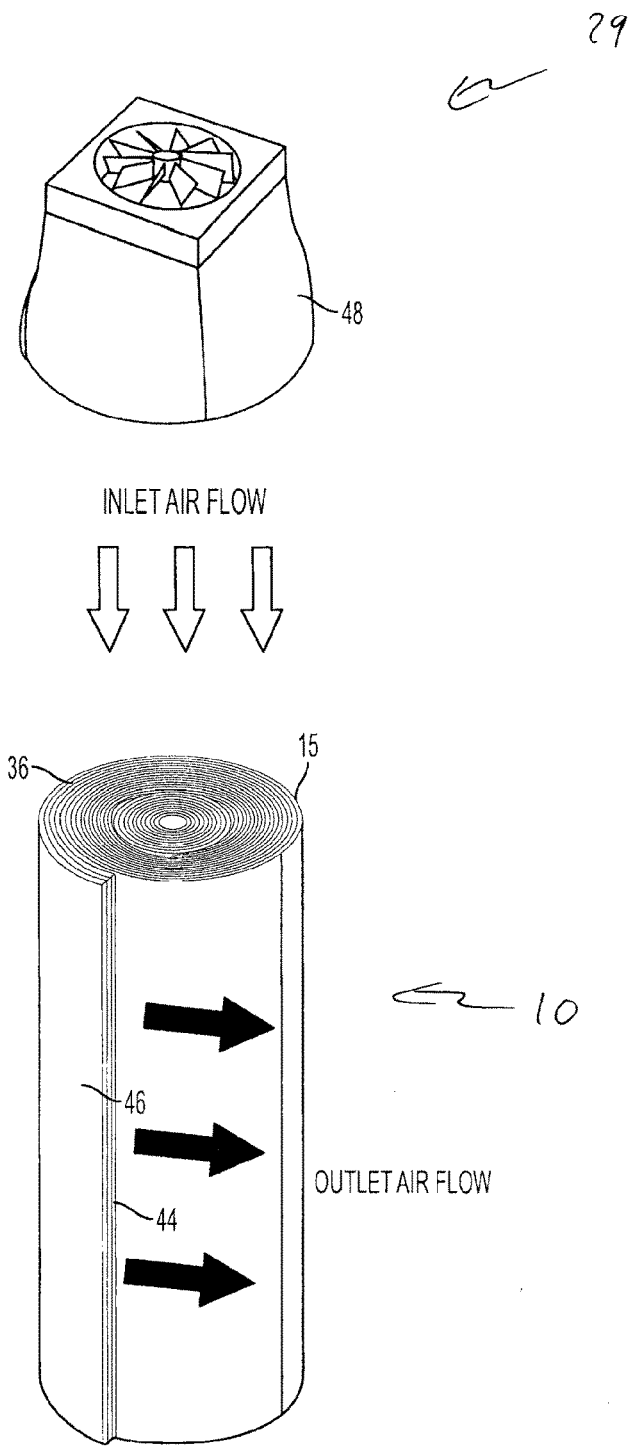
FIG. 4 is a view similar to FIG. 3 showing an alternative embodiment.

In an alternative approach, shown in FIG. 4, the roll 15 may also have a circumferential airflow exit 44 defined by ends of the fuel and oxidant electrodes 12, 14 on an outermost lap 46 of the roll 15. Thus, the airflow generator 32 may force the airflow into the axial airflow receiving end 36 of the roll between the external surfaces 24, 26 of the fuel and oxidant electrodes 12, 14 and outwardly from the circumferential airflow exit 44. Thus, the airflow may be initially axial, but exit in the circumferential direction of the roll 15. This may be dictated by a structure blocking or otherwise closing off the opposite axial end of the roll 15 (e.g., a closed end of the housing 30 could block the opposite axial end of the roll 15), thus forcing the airflow to exit the roll 15 through the circumferential airflow exit 44.

In some embodiments, the use of a housing 30 and the airflow generator 32 may be optional. For example, instead of utilizing the airflow generator 32, the cell 10 may operate by passive delivery of the oxidant (typically oxygen in ambient air). Additionally, instead of utilizing the housing 30, the roll 15 may stand alone, or may be directly connected to the airflow generator 32. In some embodiments, multiple rolls 15 may be assembled together, potentially with separators therebetween, and may be electrically connected in any suitable manner (such as in series or in parallel) to form a battery of cells 10.

The airflow generator 32 may be mounted in a cowling 48 as illustrated. This cowling 48 may attach to an axial end 34 of the housing 30, as shown in the FIG. 3, or directly to the axial end 36 of the roll, as shown in FIG. 4. The cowling 48 illustrated, or its use in general, is optional and is not intended to be limiting.

In some embodiments, the cell may be designed as a secondary or rechargeable cell, meaning that a power source can be coupled to the electrodes 12, 14 for recharging the cell by oxidizing an oxidizable oxygen species to evolve oxygen and reducing and electrodepositing a reducible metal species on the fuel electrode 12. Any metal oxide formed during discharge may disassociate during re-charge to provide availability of the reducible fuel species (which is typically the fuel species generated during fuel oxidation during discharge) and oxidizable oxygen species (which is typically the oxygen species generated during oxygen reduction during discharge). Preferably, the oxidant electrode 14 may function as an anode during re-charge for oxidizing the oxidizable oxygen species, with the fuel electrode 12 functioning as a cathode for reducing the reducible fuel species. Alternatively, a separate flexible third electrode dedicated to oxygen evolution may be included in the cell 10 and wound into the roll 15 with the fuel and oxidant electrodes 12, 14 (and may generally have the same dimensions). The anodic potential of the power source would thus be applied to this third electrode, which functions to oxidize the oxidizable oxygen species and evolve the oxygen. Either the oxidant electrode functioning as an anode or this third electrode may be referred to as a charging electrode. The ability to re-charge the cell is optional and should not be regarded as limiting.

Figure 5:
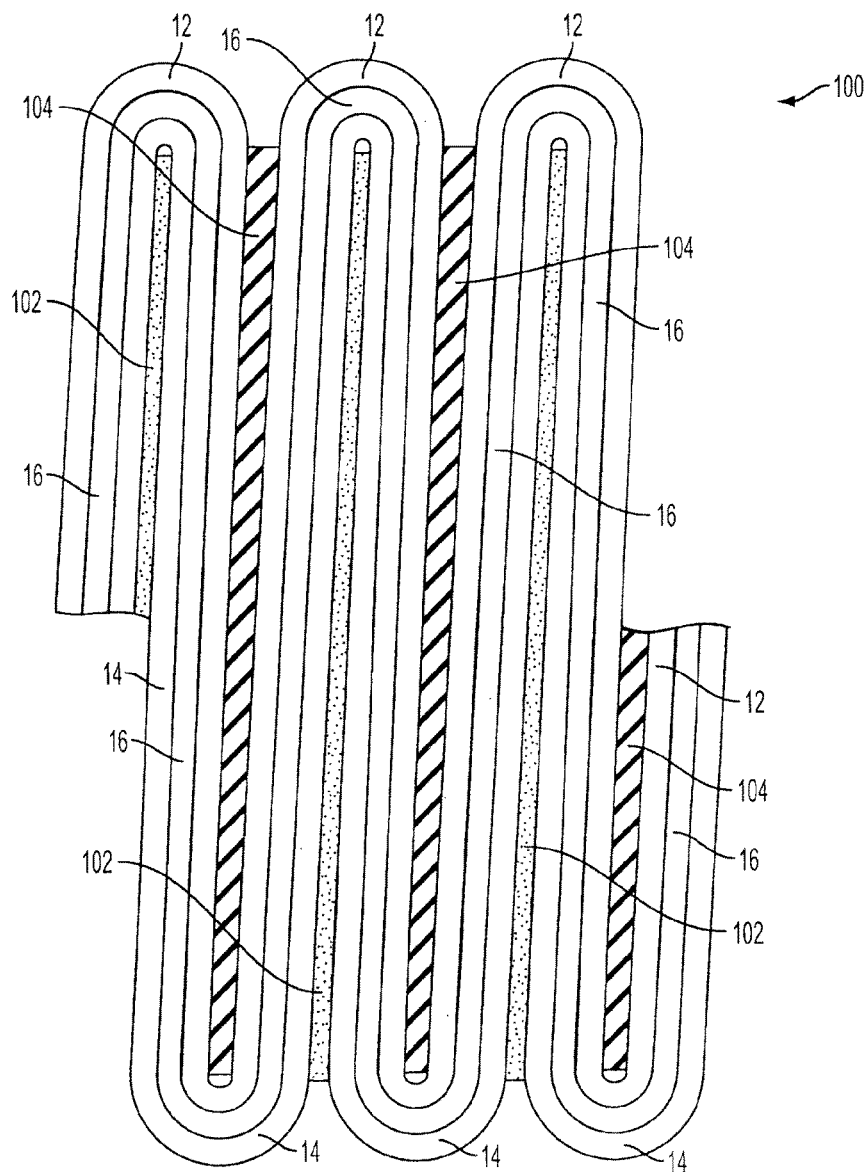
FIG. 5 is a view showing an alternative compacted, non-linear configuration for the cell.

FIG. 5 shows an alternate embodiment of a cell 100 wherein the flexible fuel electrode 12 and the flexible oxidant electrode 14 are folded in an alternating manner with portions of the external surface 26 of the oxidant electrode 14 in each fold facing one another and portions of the external surface 24 of the fuel electrode 12 in each fold facing one another (similar reference numbers are used to denote the same structures as the prior embodiments). A plurality of separators 102 may be positioned between at least the portions of the oxidant electrode's 14 external surfaces facing one another. These separators 102 are configured to enable the gaseous oxygen, typically as is present in ambient air, to be exposed to the oxidant electrode's 14 external surface, similarly to separator 28. In some such embodiments having this configuration, electroconductive contact is less of a concern, as contact between an electrode and another portion of itself will not cause shorting, whereas in the roll 15 the different electrodes 12, 14 are facing one another, and contact therebetween may cause shorting. A suitable housing or framework may be used to contain this folded cell 100.

Additionally, separators 104, which need not permit air or oxygen flow, may be used between the portions of the external surfaces of the fuel electrode 12 to assist in locating the electrodes, providing support and/or preventing the folding in the associated areas from being too sharp, which may crease or damage the electrodes. These separators 104 may be the same as separators 102 to facilitate manufacturing and avoid the need for differentiating between two different separators during assembly. Thus, it can be appreciated that a rolled configuration is not the only possible configuration of the cell 10. The cell 10 may have other compacted non-linear configurations, such as the alternate folded configuration illustrated in FIG. 5, or other configurations.

As indicated above, the oxidant electrode 14 is the subject of the present application. Accordingly, in some embodiments the additional details of the electrochemical cell 10 described above may vary in conjunction with the description of the oxidant electrode 14 provided below.

Depicted in FIG. 6 is a close up cross sectional view of an embodiment of the oxidant electrode 14, which as previously indicated, may itself be comprised of a plurality of constituent layers. In the illustrated embodiment, the oxidant electrode 14 includes an active layer 110 and a hygrophobic conductor layer 120, described in greater detail below. As shown in the illustrated embodiment, the active layer 110 is proximal to the internal surface 22 of the oxidant electrode 14, in contact with the ionic liquid 16. In an embodiment, the active material or materials of the active layer 110 may be configured to catalyze the reduction of an oxidant at the oxidant electrode 16 while a metal fuel at the fuel electrode 12 is oxidized. It may be appreciated that the active layer 110 may have some amount of permeability to the ionic liquid 16 (or other ionically conductive medium), such that the ionic liquid 16 may conduct ions between the active layer 110 and the fuel electrode 12. Porosity or other permeability of the active layer 110 may also increase active surface area, corresponding to an increase in power density. The active layer 110 of the oxidant electrode 14 may vary across embodiments, and as such may have any number or type of active materials therein. For example, in some non-limiting embodiments, the active layer 110 may comprise one or more of a number of electrocatalysts, in a variety of proportions. For example, the active materials may include electrocatalysts that may be metal oxides such as magnesium oxide, manganese oxide, nickel oxide, cobalt oxide, or doped metal oxides. The active materials may also include electrocatalysts that may be metals such as nickel, cobalt, manganese, silver, platinum, gold, palladium, or another electrocatalytically active material. These examples are not limiting. Other materials in the active layer 110 are also possible, including but not limited to carbon, perovskite and spinel powders, and organic molecules known to catalyze the reduction of oxygen such as porphyrins and pyrroles.

The configuration of the active layer 110 may also vary across embodiments. For example, in some embodiments the one or more active materials may be layered onto the hygrophobic conductor layer 120, such that one or more active materials of the active layer 110 are in electrical contact with the hygrophobic conductor layer 120 as a discrete layer. In other embodiments, the one or more active materials of the active layer 110 may be pressed onto the hygrophobic conductor layer 120, such that there may be some degree of intermingling between an outer surface 130 of the active layer 110, and an inner surface 140 of the hygrophobic conductor layer 120. Although a discrete interface between the outer surface 130 of the active layer 110 and the inner surface 140 of the hygrophobic layer 120 is depicted in FIG. 6, this is merely exemplary, and may vary depending on the composition and formation of the active layer 110, as described below.

As further shown in FIG. 6, the hygrophobic conductor layer 120 may be proximal to the external surface 26 of the oxidant electrode 14, or otherwise may have a portion that defines the external surface 26 of the oxidant electrode 14. As described above, the external surface 26 may be proximal to the separator 28 (namely in those embodiments that have the separator 28), which may facilitate the receipt of a gaseous oxidant by the oxidant electrode 14. As shown, the hygrophobic conductor layer 120 comprises a hygrophobic mixture of particles of nickel 150 and a hygrophobic binder 160. Quantities and ranges of the particles of nickel 150 and the hygrophobic binder 160 in the hygrophobic mixture may vary across embodiments, and are discussed in greater detail below. As also discussed in greater detail below, in the illustrated embodiment the hygrophobic binder 160 comprises particulates, which may be sintered together around the particles of nickel 150 to form a solid layer (i.e. the hygrophobic conductor layer 120, or a portion thereof) that as a whole is generally oxidant permeable, but generally impermeable to the ionic liquid 16. Accordingly, as described above, the usage of the word "hygrophobic" herein means repelling or resisting permeation of the ionic liquid 16 or other liquid ionically conductive medium within the cell. If the ionically conductive medium contains a significant quantity of water, the hygrophobic conductor layer 120 may be hydrophobic, which is a specific type of hygrophobicity, meaning that it resists permeation of water.

In an embodiment, the particles of nickel 150 are of a sufficient concentration such that the hygrophobic conductor layer 120 as a whole is generally electrically conductive, as described below. Specifically, sufficient particles of nickel 150 are present in the hygrophobic mixture such that the particles contact one another to form an essentially continuous electrically conductive body, which may serve as a current collector in the oxidant electrode 14. In essence, the particles of nickel 150 are generally interconnected across the hygrophobic conductor layer 120. Although it may be understood that a negligible number of the particles of nickel 150 may inadvertently be generally isolated in the hygrophobic binder 160, the concentration of the particles of nickel 150 in the hygrophobic conductor layer 120 may be sufficiently great so that there are generally no disconnected portions of the hygrophobic conductor layer 120 that cannot carry current. As such, the hygrophobic conductor layer 120 may cooperate with the active layer 110 so as to conduct the electricity that is generated through the electrochemical reactions between the active layer 110 and the fuel electrode 12 across the oxidant electrode 120 when the cell 10 is connected to a load, or to conduct the electricity that is utilized to charge the cell 10 when the cell 10 is connected to a power source.

Although the particles of nickel 150 are discussed in greater detail below, it may be appreciated that utilizing the particles of nickel 150 in the hygrophobic conductor layer 120 to provide the electrical conductivity therethrough is counter-intuitive, as nickel itself is generally hygrophilic, leading one away from utilizing it in a layer configured for hygrophobicity.

As described above, during discharge of the electrochemical cell 10, the fuel electrode 12 oxidizes a metal fuel therein, while the oxidant electrode 14 absorbs and reduces a gaseous oxidant at its active layer. The ionically conductive medium (i.e. the ionic liquid 16) separates the fuel electrode 12 and the oxidant electrode 14 to conduct ions therebetween for supporting the electrochemical reactions at the fuel and oxidant electrodes 12, 14. Where the active layer 110 is at least partially permeable to the ionic liquid 16, a portion of the oxidant electrode 14 that is more proximal to the external surface 26 may generally be impermeable to the ionic liquid 16, so that the ionic liquid 16 does not displace or otherwise prevent the oxidant from reaching the oxidant electrode 14, or short the cell 10 by conducting ions between multiple windings or foldings of the cell 10 in the wound or folded configurations. As such, in an embodiment the amount of the hygrophobic binder 160 in the hygrophobic conductor layer 120 may be of sufficient quantity to enable hygrophobicity of the hygrophobic conductor layer 120, preventing permeation of the ionic liquid 16 therethrough.

Although in the highly simplified cross sectional view of the hygrophobic conductor layer 120 in FIG. 6 there appear to be disconnects between the particles of nickel 150 and the hygrophobic binder 160, it may be appreciated that obscured or otherwise unseen connections between the particles of nickel 150 and the hygrophobic binder 160 are also present in the hygrophobic conductor layer 120. Additionally, the simplified depiction of the particles of nickel 150 and the hygrophobic binder 160 does not show that many more particles may exist in the layer than those illustrated. As such, the particles of nickel 150 may contact one another in various locations so as to generally provide the conductivity and current collection for the hygrophobic conductor layer 120 as a whole, while the particles forming the hygrophobic binder 160 may generally contact one another in various locations, and bind with the particles of nickel 150, so as to generally provide air permeability but liquid impermeability (i.e. hygrophobicity to the ionic liquid 16) to the hygrophobic conductor layer 120 as a whole.

It may be appreciated that some or all of the particles of nickel 150 may differ in morphology. In various embodiments of the hygrophobic conductor layer 120, differing varieties of the particles of nickel 150 may be utilized. In some embodiments, the particles of nickel 150 may be provided as a nickel powder, which may be bound within the sintered hygrophobic binder 160, as described below. Although any number of nickel morphologies may be utilized in various embodiments, in some non-limiting embodiments, the nickel powder may be in the form of nickel flakes, nickel filaments, nickel platelets, or nickel spheres. In some embodiments, various nickel morphologies may be combined in the nickel powder used as the particles of nickel 150. In some embodiments, the morphology or combination of morphologies of the particles of nickel 150 may affect the overall conductivity and current collecting capabilities of the hygrophobic conductor layer 120. For example, in some embodiments, nickel having flake or filament morphologies may provide greater current collection and conduction in the hygrophobic conductor layer 120, and thus may be preferred over utilizing nickel in other morphologies, such as the nickel sphere morphology. Additionally, the morphology or morphologies of the particles of nickel 150 that are utilized in the hygrophobic conductor layer 120 may affect how the hygrophobic binder 160 binds to the particles of nickel 150, which may also affect the hygrophobicity of the hygrophobic conductor layer 120. Additionally, the particles of nickel 150 may be of any appropriate size, including but not limited to being approximately 20 nm to 40 μm in diameter. In one non-limiting embodiment, the particles of nickel 150 may comprise filaments of nickel that are approximately 20 μm in length, and approximately 2 μm in diameter.

In various embodiments, the type or configuration of the hygrophobic binder 160 may also differ. For example, in some embodiments, the hygrophobic binder 160 may comprise polytetrafluoroethylene (PTFE). In other embodiments, the hygrophobic binder 160 may comprise fluorinated ethylene propylene (FEP), perfluoroalkoxy (PFA), polyvinylidene fluoride (PVDF), or another fluorinated polymer. In some embodiments, multiple types of hygrophobic binder 160 may be utilized together in hygrophobic conductor layer 120. As with the particles of nickel 150, there may be differing morphologies for particles of the hygrophobic binder 160. For example, in various embodiments the particles of the hygrophobic binder 160 may include flakes, microspheres, beads, pebbles, grains, or so on. Accordingly, any number of morphologies for particles of the hygrophobic binder 160 are possible, and may be utilized in various embodiments. Additionally, the particles of the hygrophobic binder 160 may also be of any appropriate size, including but not limited to being approximately 20 nm to approximately 500 μm in diameter prior to processing. It may be appreciated that the particles of hygrophobic binder 160 may reduce in size during processing (i.e. milling, grinding, or so on). In some embodiments, the hygrophobic binder 160 may be pre-processed into a sheet, such that the particles of nickel 150 are sintered into the sheet of the hygrophobic binder 160 to form at least a part of the electrically conductive hygrophobic conductor layer 120. In other embodiments, particles of the hygrophobic binder 160 and the particles of nickel 150 may be sintered or otherwise bound together to form at least a part of the hygrophobic conductor layer 120.

While in some embodiments binding the particles of nickel 150 and the hygrophobic binder 160 may include sintering the particles together, differing processing mechanisms may also or alternatively be utilized to combine the particles of nickel 150 and the hygrophobic binder 160, in various proportions, to form a hygrophobic mixture for the hygrophobic conductor layer 120. For example, in some embodiments, the hygrophobic mixture may contain approximately 25-75% by volume of the particles of nickel 150, with some or all of the balance being the hygrophobic binder 160. As a more particular example, in an embodiment the hygrophobic mixture may contain approximately 40-60% by volume of the particles of nickel 150, with some or all of the balance being the hygrophobic binder 160. As a yet more particular example, in an embodiment the hygrophobic mixture may contain approximately 50% by volume of the particles of nickel 150, with some or all of the balance being the hygrophobic binder 160. As another example, in some embodiments, the hygrophobic mixture may contain approximately 25-75% by volume of the hygrophobic binder 160, with some or all of the balance being the particles of nickel 150. As a more particular example, in an embodiment the hygrophobic mixture may contain approximately 40-60% by volume of the hygrophobic binder 160, with some or all of the balance being the particles of nickel 150. As a yet more particular example, in an embodiment the hygrophobic mixture may contain approximately 50% by volume of the hygrophobic binder 160 with some or all of the balance being the particles of nickel 150. Accordingly, it may be appreciated that in some embodiments, other materials, such as but not limited to additives that assist in the binding, hygrophobicity, or electrical conductivity of the hygrophobic conductor layer 120, may additionally be included in the hygrophobic mixture that is sintered or otherwise bound to form the hygrophobic conductor layer 120.

In embodiments where the manufacturing of the hygrophobic conductor layer 120 includes sintering the hygrophobic binder 160 together around the particles of nickel 150, such sintering may be understood to include utilizing heat and pressure to bond and partially fuse masses of the hygrophobic binder 160 together. In other embodiments, the manufacturing of the hygrophobic conductor layer 120 may comprise melting the hygrophobic binder 160, and inserting particles of nickel 150 therein, from which a sheet of the hygrophobic conductor layer 120 is formed. Although the dimensions of the hygrophobic conductor layer 120 may vary across embodiments, such as when the oxidant electrode 14 is being utilized in a wound or folded cell configuration, in some non-limiting embodiments the hygrophobic mixture of the particles of nickel 150 and the hygrophobic binder 160 in the hygrophobic conductor layer 120 may generally be pressed such that the hygrophobic conductor layer 120, or the entire oxidant electrode 14, is approximately ten to sixty microns thick (i.e. from the inner surface 140 to the external surface 26). In some embodiments, the thickness of the hygrophobic conductor layer 120 as manufactured may be configured to be thin enough to permit flexibility for use in the wound or folded configuration of the cell 10, while being thick enough to maintain electrical connectivity through the particles of nickel 150.

In some embodiments, the particles of nickel 150 and the hygrophobic binder 160 may be assembled so as to achieve a desirable gradient or concentration at various locations in the hygrophobic conductor layer 120. For example, in an embodiment particles of the hygrophobic binder 160 may be laid out to have a greater concentration at a side of the hygrophobic conductor layer 120 proximal to the external surface 26, while the particles of nickel 150 may be laid out to have a greater concentration at a side of the hygrophobic conductor layer 120 proximal to the inner surface 140. In some embodiments, such controlled concentrations may facilitate electrical connection between the active layer 110 and the particles of nickel 150 in the hygrophobic conductor layer 120. Likewise, such controlled concentrations may facilitate a greater degree of hygrophobicity proximal to the external surface 26, and in some embodiments may facilitate a lack of electrical conductivity at the external surface 26.

The mechanism to assemble the hygrophobic conductor layer 120 may vary in some embodiments as well. For example, in some embodiments the particles of nickel 150 (and potentially particles of the hygrophobic binder 160 as well) may be laid onto a backing material utilizing any number of coating techniques. For example, in some embodiments the particles of nickel 150 and/or the hygrophobic binder 160 may be provided in a suspension that may allow for a fluid-like application, prior to the suspension drying. The suspension may then be applied to the backing material, which in some embodiments may be a sheet of hygrophobic binder 160 (i.e. in an embodiment, a porous PTFE membrane,).

In various embodiments, differing coating techniques may be utilized to apply the particles of nickel 150 to the backing material. For example, in an embodiment gravure coating may be utilized, where an engraved roller is utilized to lift the particles of nickel 150 and press the particles of nickel 150 nickel onto the backing material using a pressure roller. In another embodiment, reverse roller coating may be utilized, where the particles of nickel 150 are applied to an application roller, which rolls the particles of nickel 150 onto the backing material. In another embodiment, Meyer rod coating may be utilized, where a wire-wound metering rod (i.e. a Meyer rod) of a particular thickness and number of windings rolls over the particles of nickel 150 and the hygrophobic binder 160 in the suspension, allowing a desired quantity of the suspension to remain on the backing material. In yet another embodiment, called slot-die coating, the particles of nickel 150 and the hygrophobic binder 160 in the suspension may be squeezed or extruded through a slot onto the backing material. In a further embodiment, curtain coating may be utilized, where a generally constant flow of the particles of nickel 150 and the hygrophobic binder 160 in the suspension forms a curtain, through which the backing material moves at a constant rate, applying the suspension thereon. In some embodiments, the particles of nickel 150 and/or particles of the hygrophobic binder 160 may be separately coated onto the backing material, and may utilize mechanisms such as those described above. For example, separate suspensions, one of which containing the particles of nickel 150, the other of which containing the hygrophobic binder 160, may be separately applied to the backing material. In some embodiments, coating techniques such as those described above may also be utilized to lay the active layer 110 onto the hygrophobic conductor layer 120, although generally this would be performed once the hygrophobic conductor layer 120 is formed, so that the hygrophobic conductor layer 120 serves as a carrier substrate for the active layer 110.

As indicated above, in some of the above embodiments a sheet of the hygrophobic binder 160 may be provided as a backing material, and may be coated with or otherwise covered in both the particles of nickel 150 and particles of the hygrophobic binder 160. In some embodiments, however, particles of the hygrophobic binder 160 may be applied as a coating to a temporary backing material, which may be subsequently removed (i.e. once assembly of the hygrophobic conductor layer 120 or the oxidant electrode 14 is complete). In some embodiments, once the particles of nickel 150 and particles of the hygrophobic binder 160 are applied to the backing layer, or once the particles of nickel 150 are applied to a sheet of hygrophobic binder 160, further processing may be performed to bind the particles of nickel 150 and the hygrophobic binder 160. For example, in an embodiment, the applied particles of nickel 150 and the hygrophobic binder 160 may be dried, which may evaporate any solvent utilized to create the suspension that was utilized to apply the particles of nickel 150 and/or particles of the hygrophobic binder 160.

In some embodiments, a cold-press process may be utilized to compact the particles of nickel 150 and the hygrophobic binder 160. In embodiments wherein the particles of nickel 150 are applied to a sheet of hygrophobic binder 160, the cold-press may press and embed the particles of nickel 150 into the hygrophobic binder 160. In some embodiments, the cold press may also aid in shaping the mixture of the particles of nickel 150 and the hygrophobic binder 160, so that the hygrophobic conductor layer 120 may be of a desired consistency or thickness. As indicated above, in some embodiments the mixture of the particles of nickel 150 and the hygrophobic binder 160 may subsequently be sintered (i.e. hot-pressed), whereby the heat and pressure applied to the mixture is sufficient to bind the particles of nickel 150 and the hygrophobic binder 160 into a durable layer which may form the hygrophobic conductor layer 120, or a portion thereof. In some embodiments, additional coatings may be applied to the mixture prior to or subsequent to the sintering of the particles of nickel 150 and the hygrophobic binder 160, and may form additional portions of the hygrophobic conductor layer 120, or additional layers of the oxidant electrode 14 thereon.

As indicated above, in some embodiments, the additional layers of the oxidant electrode 14 may include the active layer 110, which may contain the active materials configured to catalyze electrochemical reactions at the oxidant electrode 14. Again, such active materials may be configured so that during discharge of the electrochemical cell 10, the oxidant electrode 14 may reduce the oxidant, while a metal fuel is oxidized at a fuel electrode 12 that is spaced from the oxidant electrode 14 by the ionic liquid 16. It may also be appreciated that such active materials may also be configured to catalyze oxidizing an oxidizable oxygen species to evolve oxygen while a reducible metal species is reduced and electrodeposited on the fuel electrode 12. In various embodiments, the active materials that catalyze reduction of the oxidant and the active materials that catalyze oxidation of the oxidizable oxygen species may be different from one another, and may both be present in the active layer 110, or elsewhere on the oxidant electrode 14. Likewise, in various embodiments charging of the electrochemical cell 10 may be performed by a separate layer having thereon active materials configured to catalyze the oxidation of the oxidizable oxygen species.

Although particular configurations of the cell 10 and its constituent components are described in the illustrated embodiments above, it may be appreciated that some of these elements may be modified, combined, or removed in various embodiments, and the arrangement of the components may also be modified without departing from the nature of the inventive concepts described herein. For example, in any embodiment, it is possible to eliminate the separator 28 or separators 102, and the separation noted (either between the fuel and oxidant electrode external surfaces, or the adjacent oxidant electrode external surface portions) may be achieved by other structures. As an example, a retainer may position the electrodes in the spaced apart relation. By way of examples only, such a retainer may be a groove or seat formed in a housing or frame, clips, locating features or other such structures, and need not be a layer or structure that is positioned between the electrodes or portions thereof.

In some embodiments, the electrodes need not be wound, folded, or otherwise arranged in a compacted configuration (although that is preferred for achieving high power and/or energy density in a manageable and practical geometric volume). It is possible for the electrodes to be flat, or have any other configuration, in some embodiments, including but not limited to low power and/or low energy storage applications.

Typically, in any use of a cell the oxygen absorbed and reduced by the oxidant electrode 14 will be from ambient air. However, it is possible to operate a cell in an oxygen enriched environment for some applications. Thus, reference to gaseous oxygen includes oxygen naturally present in ambient air, oxygen enriched air, contained sources of oxygen, and any other form comprising or consisting of gaseous oxygen.

Although the embodiments discussed above have the ionic liquid contacting both the fuel and oxidant electrodes, it is possible in other embodiments to have it contacting just one electrode (i.e., the fuel electrode on the oxidant electrode) with another ionically conductive layer or medium contacting the other electrode, and an interface, such as a liquid junction or thin, flexible permeable membrane, would be provided therebetween. Either way, the additional layer or medium may be flexible (either by being a flexible solid/semi-solid, or being a liquid, which is inherently flexible), as would any membrane used at the interface. The additional layer/medium could be, for example, an additional ionic liquid or a non-ionic liquid electrolyte solution. The materials selected and design approach used may vary based on an array of factors, including cost, intended life cycle, energy density, power density, etc.

The foregoing embodiments have been provided to illustrate the structural and functional principles of the present invention, and should not be regarded as limiting. To the contrary, the present invention(s) are intended to encompass all modifications, alterations, substitutions or equivalents within the spirit and scope of the following claims.

What is claimed:

1. An electrochemical cell, comprising:
   a flexible fuel electrode for oxidizing a metal fuel;
   a flexible oxidant electrode for absorbing a gaseous oxidant; and
   a liquid ionically conductive medium contained in a space between the flexible fuel electrode and the flexible oxidant electrode for conducting ions for supporting the electrochemical reactions at the flexible fuel and oxidant electrodes;
   wherein the flexible oxidant electrode comprises:
   (a) a hygrophobic conductor layer comprising a sintered hygrophobic mixture of: (i) nickel particles and (ii) a hygrophobic binder, wherein the nickel particles in the sintered hygrophobic mixture are essentially continuous so as to conduct electricity throughout the hygrophobic conductor layer and serve as a current collector for the flexible oxidant electrode, and
   (b) an active layer distinctly layered onto the hygrophobic conductor layer for electrical contact therewith, the active layer comprising one or more active materials for catalyzing electrochemical reactions at the flexible oxidant electrode for reducing the gaseous oxidant,
   wherein the hygrophobic conductor layer both conducts current for the reduction of the gaseous oxidant and essentially prevents permeation of the liquid ionically conductive medium, and
   wherein the active layer of the flexible oxidant electrode is provided on a proximal side of the flexible oxidant electrode and is in contact with the liquid ionically conductive medium in the space and wherein the hygrophobic conductor layer is provided on a distal side of the flexible oxidant electrode.

2. The electrochemical cell of claim 1, wherein the sintered hygrophobic mixture comprises nickel powder bound by sintered hygrophobic binder particles.

3. The electrochemical cell of claim 2, wherein the nickel powder comprises nickel flake, nickel filament, nickel platelet, or nickel sphere morphologies.

4. The electrochemical cell of claim 1, wherein the sintered hygrophobic mixture contains approximately 25-75% nickel by volume.

5. The electrochemical cell of claim 1, wherein the sintered hygrophobic mixture contains approximately 25-75% hygrophobic binder by volume.

6. The electrochemical cell of claim 2, wherein the particles of hygrophobic binder comprises one or more of: fluorinated ethylene propylene, perfluoroalkoxy, and polyvinylidene fluoride.

7. The electrochemical cell of claim 1, wherein the hygrophobic conductor layer is approximately 10-60 microns in thickness.

8. The electrochemical cell of claim 1, wherein the flexible fuel electrode and the flexible oxidant electrode are arranged in a compacted non-linear configuration with an external surface of the oxidant electrode exposed for absorbing a gaseous oxidant.

9. The electrochemical cell of claim 1, wherein, during discharge of the electrochemical cell, the one or more active materials are configured to catalyze reducing the oxidant at the flexible oxidant electrode, while the metal fuel is oxidized at the flexible fuel electrode.

10. The electrochemical cell of claim 1, wherein the active materials comprise one or more of magnesium oxide, manganese oxide, nickel oxide, cobalt oxide, doped metal oxides, nickel, cobalt, manganese, silver, platinum, gold, palladium, carbon, perovskite and spinel powders, and organic porphyrins or pyrroles.

11. The electrochemical cell of claim 1, wherein the one or more active materials are further configured for oxidizing an oxidizable oxygen species.

12. The electrochemical cell of claim 11, wherein, during recharge of the electrochemical cell, the one or more active materials are configured to catalyze oxidizing the oxidizable oxygen species at the flexible oxidant electrode, while a reducible metal fuel species is reduced at the flexible fuel electrode.

13. An oxidant electrode for an electrochemical cell utilizing a fuel electrode and a liquid ionically conductive medium, wherein during discharge of the electrochemical cell, the fuel electrode oxidizes a metal fuel therein, the oxidant electrode absorbs and reduces the gaseous oxidant, and the ionically conductive medium separates the fuel electrode and the oxidant electrode to conduct ions therebetween for supporting the electrochemical reactions at the fuel and oxidant electrodes the oxidant electrode comprising:
   an active layer comprising one or more active materials for catalyzing electrochemical reactions at the oxidant electrode for reducing a gaseous oxidant; and
   a hygrophobic conductor layer comprising a sintered hygrophobic mixture of: (i) nickel particles and (ii) a hygrophobic binder, wherein the nickel particles in the sintered hygrophobic mixture are essentially continuous so as to conduct electricity throughout the hygrophobic conductor layer and serve as a current collector for the oxidant electrode, wherein the hygrophobic conductor layer both conducts current for the reduction of the gaseous oxidant and essentially prevents permeation of the liquid ionically conductive medium, and wherein the active layer is distinctly layered onto the hygrophobic conductor layer for electrical contact therewith, wherein the active layer of the oxidant electrode is provided on a proximal side of the oxidant electrode for contact with the liquid ionically conductive medium and wherein the hygrophobic conductor layer is provided on a distal side of the oxidant electrode.

14. The oxidant electrode of claim 13, wherein the sintered hygrophobic mixture comprises nickel powder bound by sintered hygrophobic binder particles.

15. The oxidant electrode of claim 14, wherein the nickel powder comprises nickel flake, nickel filament, nickel platelet, or nickel sphere morphologies.

16. The oxidant electrode of claim 13, wherein the sintered hygrophobic mixture contains approximately 25-75% nickel by volume.

17. The oxidant electrode of claim 13, wherein the sintered hygrophobic mixture contains approximately 25-75% hygrophobic binder by volume.

18. The oxidant electrode of claim 14, wherein the particles of hygrophobic binder comprises one or more of:, fluorinated ethylene propylene, perfluoroalkoxy, and polyvinylidene fluoride.

19. The oxidant electrode of claim 13, wherein the hygrophobic conductor layer is approximately 10-60 microns in thickness.

20. The oxidant electrode of claim 13, wherein the oxidant electrode is flexible, and configured for use in the electrochemical cell whereby the fuel electrode is also flexible, such that the flexible fuel and oxidant electrodes are configured to be arranged in a compacted non-linear configuration, with an external surface of the flexible oxidant electrode exposed for absorbing the gaseous oxidant.

21. The oxidant electrode of claim 13, wherein, during discharge of the electrochemical cell, the one or more active materials are configured to catalyze reducing the oxidant at the oxidant electrode, while the metal fuel is oxidized at the fuel electrode.

22. The oxidant electrode of claim 13, wherein the active materials comprise one or more of magnesium oxide, manganese oxide, nickel oxide, cobalt oxide, doped metal oxides, nickel, cobalt, manganese, silver, platinum, gold, palladium, carbon, perovskite and spinel powders, and organic porphyrins or pyrroles.

23. The oxidant electrode of claim 13, wherein the one or more active materials are further configured for oxidizing an oxidizable oxygen species.

24. The oxidant electrode of claim 23, wherein, during recharge of the electrochemical cell, the one or more active materials are configured to catalyze oxidizing the oxidizable oxygen species at the oxidant electrode, while a reducible metal fuel species is reduced at the fuel electrode.

25. The electrochemical cell of claim 2, wherein the particles of hygrophobic binder comprises polytetrafluoroethylene.

26. The oxidant electrode of claim 14, wherein the particles of hygrophobic binder comprises polytetrafluoroethylene.

27. The electrochemical cell of claim 1, wherein the hygrophobic conductor layer is provided in the form of a sheet.

28. The oxidant electrode of claim 13, wherein the hygrophobic conductor layer is provided in the form of a sheet.

* * * * *